I. Crossett,
Dressing Staves.
No. 533. Reissued Mar. 2, 1858.
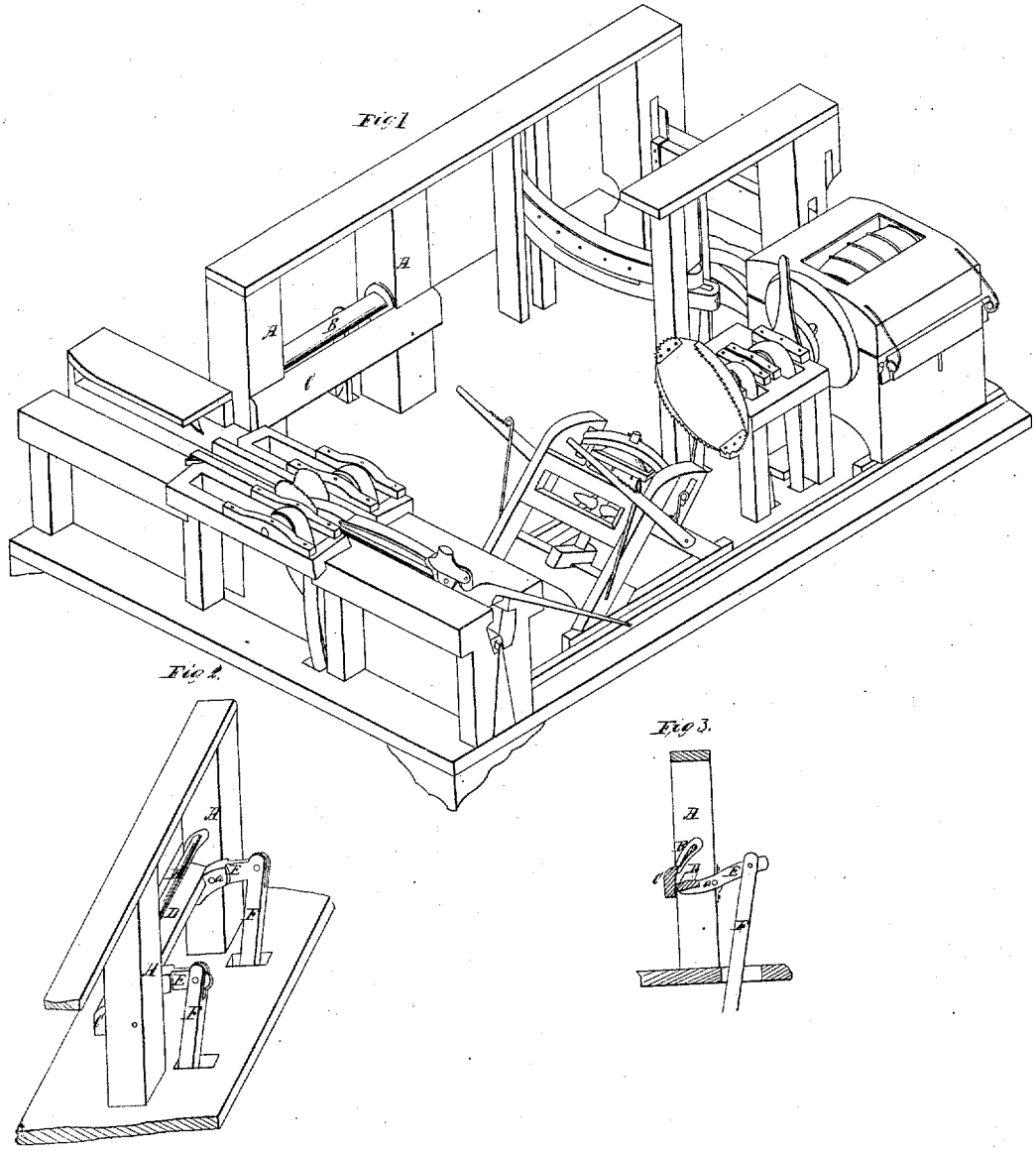
AM. PHOTO-LITHO. CO. N.Y. (OSBORNE'S PROCESS)

UNITED STATES PATENT OFFICE.

ISAAC CROSSETT, OF BENNINGTON, VERMONT.

IMPROVED MACHINE FOR MAKING BARRELS AND OTHER CASKS.

Specification forming part of Letters Patent No. 3,648, dated July 1, 1844; Reissue No. 533, dated March 2, 1858.

*To all whom it may concern:*

Be it known that I, ISAAC CROSSETT, of Bennington, in the county of Bennington and State of Vermont, have invented a new and useful Improvement in Machinery pertaining to the Manufacture of Barrels and other Casks; and I do hereby declare that the following is a full, clear, and exact description of the same, reference being had to the annexed drawings, making a part of this specification, in which—

Figure 1 is a perspective view of a series of machinery for the manufacture of barrels and other casks, among which is my improvement. Fig. 2 is a detached perspective view of my improvement. Fig. 3 is a detached transverse vertical section of the same.

Similar letters of reference indicate corresponding parts in the several figures.

This invention relates exclusively to that portion of barrel or cask machinery designed for cutting the staves.

The invention consists in the employment or use of an adjustable knife or cutter, adjustable gage, and a vibratory bed, arranged to operate as hereinafter shown, whereby the feeding of the "bolt," and the manipulation of the bolt generally during the operation of the machine, are greatly facilitated, and an extremely simple, efficient, and economical device obtained.

To enable those skilled in the art to make and use my invention, I will proceed to describe its construction and operation.

A A represent two uprights, which are secured in a proper framing, and between which a horizontal knife or cutter, B, is secured by means of screws, or in any proper way, so as to allow its edge to be moved in or out.

C is a gage which is secured to the two uprights A A, parallel with the knife or cutter B. This gage C is attached to the uprights by means of screws, or is arranged in any way to admit of its being adjusted to regulate the thickness of the staves.

D is a cutting-block or bed-piece, which is attached to levers E E, one at each end. These levers are pivoted to the uprights A A, one to each, as shown at *a*, and rods F F are pivoted to the outer ends of the levers E E, one to each, as shown clearly in Fig. 2. The cutting-block D, by operating the levers E E, moves, of course, in the arc of a circle, *a a*, being the fulcra, and the inner side of the knife B forms a part of a circle which is concentric with the axis of rotation of the cutting-block or bed-piece D, and the radius of the circle in the arc of which the cutting-block or bed D travels or moves is equal to that of the cask to be constructed, and the fulcra *a* may by any suitable arrangement be made variable, so that staves may be cut for casks of different sizes.

The operation is as follows: The bolt shown in red, Fig. 3, is steamed, and is placed on the block or bed D, the operator pushing the bolt downward against the gage C. The block or bed D is then moved upward by operating the levers E E through the medium of the bars F, or an equivalent device or arrangement, and a stave will be cut from the bolt by the knife or cutter B. The bolt, when the stave is cut from it, may, if necessary, be readily drawn back from the knife or cutter. This is often essential, for the bolt often requires to be thus manipulated, either for the purpose of being turned or for withdrawing the core.

It will be seen that gravity aids the manipulation of the bolt when being adjusted on its bed, and also when removed therefrom. This is very important, for the hot block could not be readily adjusted by the hands alone; but by my invention it may be easily and quickly managed. The machine, as a whole, is extremely simple, economical to construct, and efficient in its operation.

Having thus described my invention, what I claim as new, and desire to secure by Letters Patent, is—

The vibratory block or bed D, adjustable gage C, and knife or cutter B, arranged relatively with each other so as to operate as and for the purpose set forth.

ISAAC CROSSETT.

Witnesses:
LEWIS CADY,
J. HALSEY CUSHMAN.